United States Patent
Gipple et al.

(10) Patent No.: US 6,333,092 B1
(45) Date of Patent: Dec. 25, 2001

(54) FRACTAL INTERFACIAL ENHANCEMENT OF COMPOSITE DELAMINATION RESISTANCE

(75) Inventors: Karin L. Gipple, Arnold, MD (US); Dale G. Karr, Milan, MI (US); Liming W. Salvino, Burtonsville, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/257,475

(22) Filed: Feb. 25, 1999

(51) Int. Cl.[7] ................ B32B 3/00; B32B 5/12
(52) U.S. Cl. ............ 428/172; 428/53; 428/61; 428/112; 428/113; 428/161; 428/162; 428/163
(58) Field of Search ............... 428/172, 161, 428/156, 166, 167, 60, 33, 53, 59, 61, 62, 141, 163, 105, 112, 113, 162

(56) References Cited

U.S. PATENT DOCUMENTS

| | | | |
|---|---|---|---|
| 4,123,645 | 10/1978 | Shichida et al. | 219/69 W |
| 4,649,252 | 3/1987 | Obara | 219/69 W |
| 4,806,721 | 2/1989 | Ito et al. | 219/69 W |
| 4,839,487 | 6/1989 | Ito et al. | 219/69.12 |
| 4,902,215 | 2/1990 | Seemann, III | 425/406 |
| 5,025,363 | 6/1991 | Seki et al. | 364/191 |
| 5,307,292 | 4/1994 | Brown et al. | 364/564 |
| 5,342,401 | 8/1994 | Spano et al. | 607/5 |
| 5,435,889 * | 7/1995 | Dietrich | 428/163 |
| 5,447,520 | 9/1995 | Spano et al. | 607/5 |
| 5,522,863 | 6/1996 | Spano et al. | 607/45 |
| 5,523,143 * | 6/1996 | Hajemeyer | 428/141 |
| 5,618,601 | 4/1997 | Ruby | 428/56 |
| 5,631,065 * | 5/1997 | Gordon | 428/172 |
| 5,698,489 * | 12/1997 | Shirai et al. | 428/195 |
| 5,756,956 | 5/1998 | Sato et al. | 219/69.18 |
| 5,797,965 | 8/1998 | Spano et al. | 607/2 |
| 5,800,459 | 9/1998 | Spano et al. | 607/2 |

OTHER PUBLICATIONS

Zumbrunnen, D.A. "Composite Materials Evolved from Chaos." Proceedings of the Third Experimental Chaos Conference, World Scientific, Singapore, pp 267–271.

Chen, Z. and Mecholsky, Jr., J.J. Sep. 1993. "Control of Strength and Toughness of Ceramic/Metal Laminates Using Interface Design." *Journal of Materials Research* 8(9):2362–2369.

Tancrez, Jean–Pierre, Pabiot, Jose and Rietsch, Francois. 1996. "Damage and Fracture Mechanisms in Thermoplastic–Matrix Composites in Relation to Processing and Structural Parameters." *Composites Science and Technology* 56:725–731.

(List continued on next page.)

*Primary Examiner*—Donald J. Loney
(74) *Attorney, Agent, or Firm*—Howard Kaiser

(57) ABSTRACT

The inventive composite laminate has an interface profile which describes a fractally nonlinear contour. Inventive fabrication thereof typically includes computer numerically controlled wire-cut electrical discharge machining of a metal mold, resin transfer molding of a first composite portion using the metal mold, and resin transfer molding of a second composite portion using the first composite portion as a mold so that the interfacing surfaces of the composite portions are secondarily bonded to each other in conformal fashion. The interface surface of the second composite portion approximates the geometry of the metal mold surface, while the interface surface of the first composite portion approximates the inverted geometry of the metal mold surface. Each interface surface defines a multiplicity of lengthwise parallel grooves and ridges corresponding to the widthwise disordered undulations of the fractal interfacial profile. Both through-thickness strength and fracture toughness can be significantly increased by inventive practice of a composite laminate characterized by fractality of the interfacial profile.

20 Claims, 13 Drawing Sheets

OTHER PUBLICATIONS

Zumbrunnen, D.A. Miles, K.C., and Liu, Y.H. "Auto–Processing of Very Fine–Scale Composite Materials by Chaotic Mixing of Melts." *Composites Part A*, vol. 27A, pp 37–47, 1996. Copy of Abstract provided herewith: http://www.ces.clemson.edu/~mmpl/publication/dz_km_yl.html. Jun. 3, 1999, (Abstract only).

Zumbrunnen, D.A. "Composite Materials Evolved from Chaos." Proceedings of the Third Experimental Chaos Conference, World Scientific, Singapore, pp 267–271. Copy of Abstract provided herewith: http://www.ces.clemson.edu/~mmpl/publication/dz3html. Jun. 3, 1999.

Zumbrunnen, D.A. "Physical Properties of Composite Materials Evolved from Chaos." Proceedings of the Fourth Experimental Chaos Conference, Aug. 6–8, 1997, Orlando, Florida. World Scientific Publishing Co., Singapore (in press). Copy of Abstract provided herewith: http://www.ces.clemson.edu/~mmpl/publication/dz5.html. Jun. 3, 1999.

Zumbrunnen, D.A. "Self–Assembly of Fibrous and Lamellar Materials by Chaotic Mixing of Melts: A New Method to Produce Structured Materials." Proceedings of the NSF Design and Manufacturing Grantees Conference, University of Washington, Society of Manufacturing Engineers, Dearborn, Michigan, 1997 (in press). Copy of Abstract provided herewith: http://www.ces.clemson.edu/~mmpl/publication/dzl.html. Jun. 3, 1999.

Zumbrennen, D.A. "Enhanced Physical Properties and Novel Microstructures of Composite Materials Produced by Chaotic Mixing." Proceedings of the NSF Design and Manufacturing Grantees Conference, The National Science Foundation, pp. 689–690, 1998. Copy of Abstract provided herewith: http://www.ces.clemson.edu/~mmpl/publication/dz4.html. Jun. 3, 1999.

Karin Gipple, Dave Palmer, Liming Salvino, Robert Cawley, "Disorder characterization for Fiber Composite Materials," *FY97 Research Digest*, Naval Surface Warfare Center, Carderock Division, issued in Apr.–May 1998, pp 47–50.

Wimmer, S.A. and Karr, Dale G. 1996. "Compressive Failure of Microcracked Porous Brittle Solids." *Mechanics of Materials* 22: 265–277.

Benoit B. Mandelbrot. "A Multifractal Walk down Wall Street." *Scientific American*, Feb. 1999, pp. 70–73.

* cited by examiner

| Interface Geometry | Pressure Stress (psi) | Von Mises Stress (psi) | Tension Stress (psi) | Comments |
|---|---|---|---|---|
| Linear | 5700 | 6500 | 9900 | Below yield High tension stress over large area. Brittle failure in tension likely. |
| Sinusoidal | 5700 | 6180-6370 | 9900 | Below yield. High tension stress over large area. Brittle failure in tension likely. |
| Double Sine | 4560-7160 [5700] | 4960-7950 [6500] | 9290-10500 [9900] | Below yield-significant gradients indicate possibility of local yielding if no brittle failure in tension. Tension stresses are high, but gradient is introduced. Weibull scaling laws for local tension strengths? |
| Fractal | 771-6400 [4300] | 3180-10800 [7700] | 3320-12800 [9270] | Yield stresses increasing, possibly due to increasing shear stress component. Pressure stresses (triaxial tension) still high but decreased compared to other geometries. Failure scenario under these conditions difficult to predict. |

FIG. 2

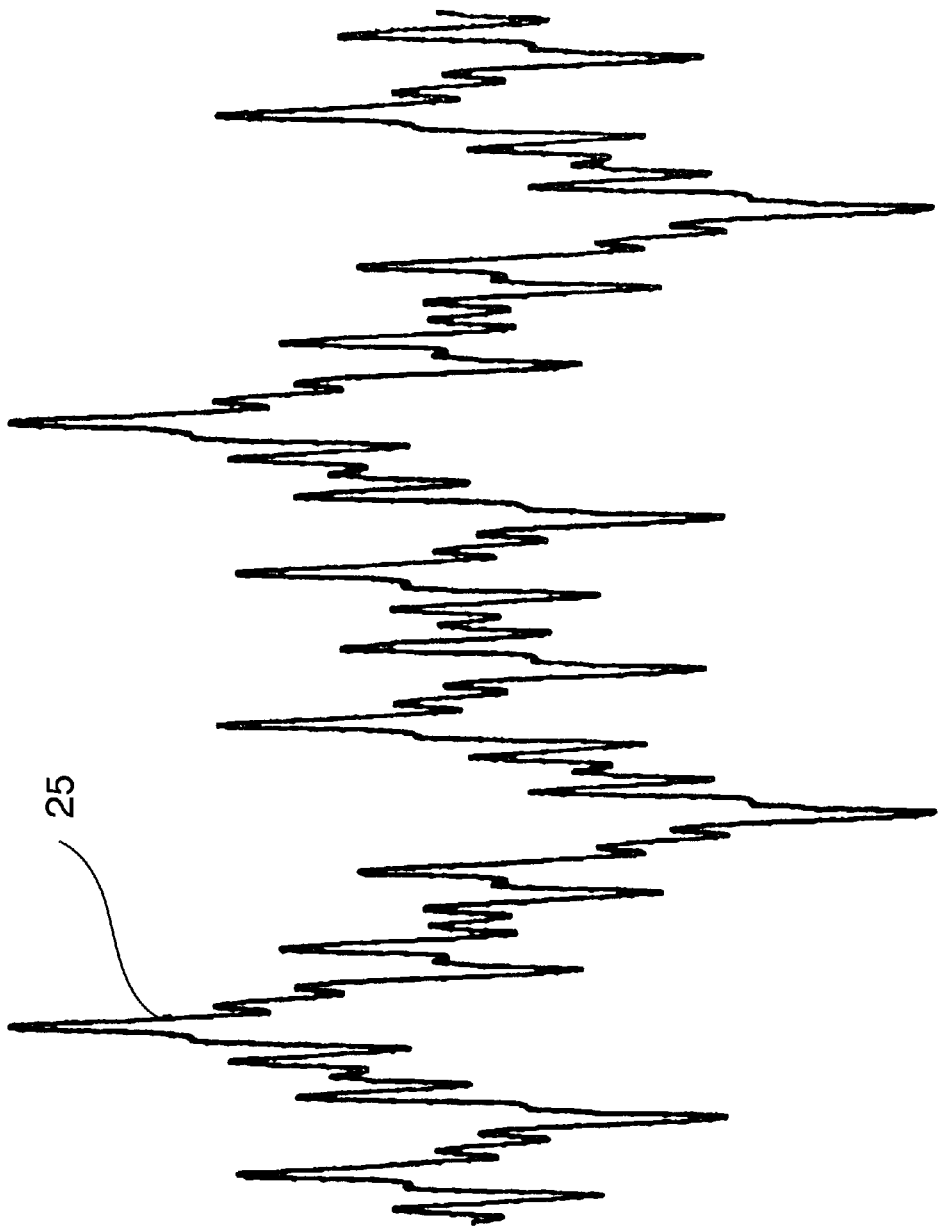

| Specimen | Strength (psi) | Modulus (Msi) | Strain-to-Failure (%) | Comments |
|---|---|---|---|---|
| Linear | | | | |
| 2-3 | 2740 | 3.43 | 0.08 | Secondary bond failure |
| 2-4 | 2280 | 2.85 | 0.08 | Secondary bond failure |
| 2-5 | 200* | --- | --- | |
| | AVE 2510 | | | |
| Fractal | | | | |
| 1-1 | 2150 | 2.15 | 0.10 | Secondary bond failure |
| 1-2 | 3730 | 2.33 | 0.16 | Secondary bond failure |
| 1-3 | 3080 | 2.36 | 0.13 | Secondary bond failure |
| 1-4 | 800* | --- | --- | |
| 1-5 | 1380* | --- | --- | |
| 2-1 | 3250 | 2.62 | 0.13 | Secondary bond failure |
| | AVE 3053 | | | |

\* Bending suspected in these specimens. Not included in averages.

FIG. 8

FRACTAL INTERFACIAL ENHANCEMENT OF COMPOSITE DELAMINATION RESISTANCE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to composite structures and to methods and apparatuses pertaining to same, more particularly wherein the composite structures are to some degree or in some respect characterized by lamination.

Many composite structures include layers which are bonded together. Various applications have given rise to concern about delamination resistance at either or both of primary bond sites and secondary bond sites. The term "delamination resistance" is conventionally understood to encompass "strength" (e.g., through-thickness tensile strength) and/or "toughness" (e.g., Mode I fracture toughness). The terms "through-thickness strength," "out-of-plane strength" and "interlaminar strength" are synonymous in conventional usage.

Improvement of the delamination resistance of composite laminates has been attempted through a variety of mechanisms. Among the known mechanical methodologies for increasing delamination resistance are the following: (i) the insertion of metal pins, stitches or fibrous rods through the thickness of the composite laminate; and, (ii) the alteration of the style of reinforcement, e.g., through utilization of tufted fabrics to improve adhesion. There are drawbacks associated with these mechanical methodologies, such as cost, degradation of mechanical properties in the plane of the laminate, etc. Another conventional methodology for enhancing delamination resistance involves toughening of brittle resins with particles made of rubber (or another high elongation material); according to these approaches, toughness is generally achieved at the expense of strength.

It is often desirable to improve both strength and toughness, for the ability to do so could delay both crack initiation and crack propagation in composite laminates. Furthermore, any improvements in through-thickness strengths in composite laminates can be viewed as advantageous, since their low strengths in that direction are usually the limiting factor in design of structures with composites. Moreover, through-thickness strength is normally very sensitive to quality; thus, improvements in toughness could minimize the flaw sensitivity of the through-thickness strength. This is significant particularly because through-thickness stresses tend to arise in structural details which are difficult to fabricate at the level of quality of flat panels.

Composite structural details for U.S. Navy marine applications frequently require the use of secondary bonds for fabrication in a shipyard environment. Secondary bond sites are interfaces where there has been lamination over a cured laminate, and they can represent a weak link in composite laminate performance. The typical microstructural appearance of a secondary bond is a discrete, linear resin-rich region between the layers of a composite laminate. This resin-rich region can result in a composite laminate with reduced strengths through-the-thickness of the laminate (i.e., normal to the secondary bond) and reduced resistance to delamination.

SUMMARY OF THE INVENTION

In view of the foregoing, it is an object of the present invention to provide a composite structure, and method and apparatus for fabricating same, wherein the composite structure has superior performance in terms of delamination resistance.

It is a further object of the present invention to provide such composite structure, method and apparatus wherein the delamination resistance includes either or both of through-thickness strength and fracture toughness.

Another object of this invention is to provide such composite structure, method and apparatus wherein the improvement of delamination resistance with respect to toughness does not result in the worsening of delamination resistance with respect to strength, or vice versa.

A further object of this invention is to provide such composite structure, method and apparatus wherein the improvement of delamination resistance does not result in the worsening of a mechanical property unrelated to delamination resistance.

Another object of this invention is to provide such composite structure, method and apparatus which are cost-effective.

The present invention features the effectuation of a fractal form of disordered geometry at a composite lamina interface. Fractal geometry is advantageous (vis-a-vis' non-fractally disordered geometry) because it represents a reproducible and simplified mathematical regime for introducing geometric disorder. The disordered interface geometry—and specific characteristics associated therewith—are inventively related to specific mechanical or material properties such as through-thickness strength and fracture toughness. According to this invention, fractal topology is not only related to certain material/mechanical properties, but is also used to selectively enhance particular material/mechanical properties. In particular, fractal interfaces in composite laminates are inventively used as strengthening and/or toughening mechanisms.

In accordance with this invention, a composite structure comprises a first lamina and a second lamina. The first lamina has a first laminal surface which defines a first laminal fractal profile. The second lamina has a second laminal surface which defines a second laminal fractal profile. The second laminal fractal profile is complementary with respect to the first laminal fractal profile. The first laminal surface and the second laminal surface join so as to form an interface which defines an interfacial fractal profile. The interfacial fractal profile is described by the engagement of the first laminal fractal profile and the second laminal fractal profile.

Also in accordance with this invention, a method for making a composite structure comprises: providing a metal mold; resin transfer molding a first lamina; and, resin transfer molding a second lamina. The metal mold has a mold surface which defines a mold fractal profile. The first lamina has a first laminal surface which defines a first laminal fractal profile which is effected by the mold fractal profile. The second lamina has a second laminal surface which defines a second laminal fractal profile which is effected by the first laminal fractal profile.

The present invention admits of embodiments wherein there is secondary bonding of the first lamina and the second lamina, as well as embodiments wherein the first lamina and the second lamina are joined in the absence of secondary bonding. When secondary bonding is implemented, the inventive composite structure comprises a secondary bond layer which at least substantially occupies the fractally profiled interface between the first lamina and the second lamina. The inventive fabrication method can thus include secondarily bonding the second laminal surface with respect to the first laminal surface, in association with the resin transfer molding of the second lamina.

The following papers, hereby incorporated herein by reference, disclose relationships between various forms of microstructural disorder and improvement in various macroscopic properties:

Chen, Z. and Mecholsky, Jr., J. J. September 1993. "Control of Strength and Toughness of Ceramic/Metal Laminates Using Interface Design." *Journal of Materials Research* 8(9):2362–2369;

Tancrez, Jean-Pierre, Pabiot, Jose and Rietsch, Francois. 1996. "Damage and Fracture Mechanisms in Termoplastic-Matrix Composites in Relation to Processing and Structural Parameters." *Composites Science and Technology* 56:725–731;

Zumbrunnen, D. A. 1997. "Microstructures and Physical Properties of Composite Materials Evolved from Chaos." Proceedings of the *Fourth Experimental Chaos Conference*, Aug. 6–8, 1997, Boca Raton, Fla.

Tancrez et al. disclose improved ductility in toughened polymers where small, non-propagating crases formed a stable "micronet" through which a dominant crack would have to propagate.

Zumbrunnen discloses use of chaotic motion to develop very fine-scale microstructures and interfaces in two-phase thermoplastic blends. According to Zumbrunnen progressive intertwining of the major and minor phase components led to enhanced material properties (toughness, ductility, strength and electrical conductivity).

Chen et al. disclose in-plane loading of a composite laminate comprising a brittle alumina layer and a ductile nickel layer. According to Chen et al., the greater the tortuosity (tortuosity quantified by fractals) of the interface between alumina and nickel layers in ceramic/metal composites, the greater the force required to separate the layers. Chen et al. found that there was an increase in strength, but a decrease in toughness, with increasing fractal dimension (i.e., increasing disorder). Chen et al. speculate that the decrease in toughness which they observed resulted from the inability of the ductile layer to plastically deform as it was constrained by the brittle layer.

As contrasted with Chen et al., Tancrez et al. and Zumbrunnen et al., the present invention uniquely concerns the relationship of a disordered interfacial microstructure of a composite laminate to two specific macroscopically improved properties, viz., out-of-plane strength and fracture toughness.

It is noted that the analysis and testing performed by the inventors has involved out-of-plane loading, whereas Chen et al. discloses in-plane loading. Chen et al. not only used a different loading direction but also used different materials. Moreover, Chen et al. addressed a phenomenon which is similar to a known phenomenon which is a manufacture by-product or artifact of linearly interfaced laminates. That is, Chen et al. observed made an observation similar to the observation that the interface bond geometry of laminates which are essentially linear will be characterized by disorder along the border or periphery, due to irregularities in fiber packing at such border or periphery.

As distinguished from Chen et al., the present invention uniquely provides disorder (in particular, fractality) of the the entire ductile (resin) secondary bond inteface layer, not just of the border or periphery. The disorder is inventively achieved by using a machined mold plate and by carefully choosing fiber reinforcement so as to ensure that the fibers nest in the peaks and valleys of the interface. The inventive results of numerical analyses suggest that both strength and toughness may be enhanced if small cracks form but do not propagate. In other words, the present invention uniquely avails of a newly discovered relationship whereby both strength and toughness increase with increasing disorder; in particular, when the disorder is fractal in nature, both strength and toughness increase with increasing fractal dimension.

According to inventive principles, a fractal interface geometry provides benefits over a more ordered interface geometry through the reduction of pressure stresses and the introduction of yield stress gradients. The formation of the small cracks results in the release of constraints to plastic flow. However, the cracks do not propagate, due to the tortuosity of the crack path and to the complex local stress state, both of which are introduced by the disordered geometry. The small cracks initiate at sites of localized tensile stress concentration, generally situated proximate the "maxima" and "minima" of the fractal interface profile. These small cracks act not only as liberators of transverse constraints to plastic flow, but also as energy-absorbing mechanisms.

The present inventorship includes U.S. Navy employees. Secondary bonds appear frequently in Navy composite structures due to thickness, geometry and fabrication constraints. Secondary bonds represent a potential weak link in the performance of composite structural details, because improper fabrication and assembly may result in lower strength and toughness at the secondary bond site as compared to the primary structure. Various embodiments of the present invention can be used to improve secondary bond strength/toughness or provide alternate fabrication and assembly options. This would result in improved structural performance and/or reduced productions costs.

More generally, the inventive utilization of a controlled, disordered interface geometry to improve composite strength and toughness in the presence of through-thickness stresses opens up additional options, beyond material selection, to improve composite structural performance and efficiency.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described by way of example, with reference to the accompanying drawings, wherein like numbers indicate the same or similar components, and wherein:

FIG. 2 is a table of stress summary results obtained from the inventive finite element analyses of interface models such as shown in FIG. 1(*a*) through FIG. 1(*c*).

FIG. 7(a) is a diagrammatic partial elevation view of an idealized interface profile.

FIG. 8 is a table of inventive experimental results, including strengths and strains-to-failure.

BRIEF DESCRIPTION OF THE APPENDICES

The following appendices are hereby made a part of this disclosure:

Attached hereto marked APPENDIX "A" is a copy of a thirty-six page manuscript, authored by joint inventors Dale Karr and Karin Gipple, entitled "Fractal Fracture Mechanics of Interlaminar Tensile Failure of Composites." This manuscript, hereby incorporated herein by reference, was recently submitted to the *International Journal of Fracture*, but has not as yet been accepted for future publication. Previously, a similar rendering of this manuscript was submitted to, but not accepted for future publication by, *Mechanics of Materials*.

DETAILED DESCRIPTION OF THE INVENTION

One of the present inventors (Karin Gipple, a Navy materials engineer) initially discerned, at a magnification of 10–20×, a qualitative relationship between through-thickness tension strength of a composite laminate and its microstructural disorder. Subsequently, she and other Navy researchers conducted a number of numerical and analytical studies to investigate and compare the effects of four kinds of secondary bond geometries (linear, sinusoidal, superimposed sine waves and fractally disordered) at the interface between layers of a composite laminate. See the following paper, hereby incorporated herein by reference: Karin Gipple, Dave Plamer, Liming Salvino, Robert Cawley, "Disorder characterization for Fiber Composite Materials," *FY97 Research Digest*, Naval Surface Warfare Center, Carderock Division, issued in April–May 1998, pp 47–50.

Figure 1A:
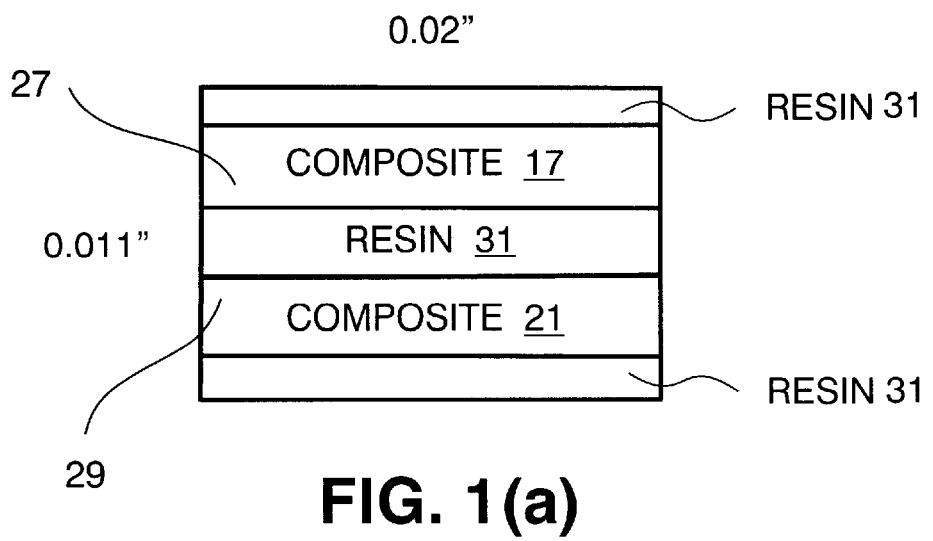
FIG. 1(*a*), FIG. 1(*b*), and FIG. 1(*c*) are diagrammatic cross-sectional views of three interface geometries—viz., linear (square), superimpositionally sinusoidal and fractal, respectively—which were used as numerical models in inventive finite element analyses.
Figure 1B:
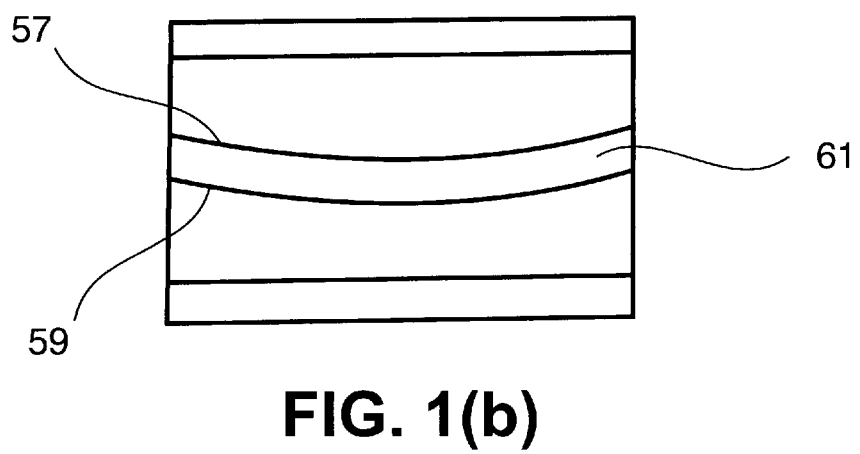
Figure 1C:
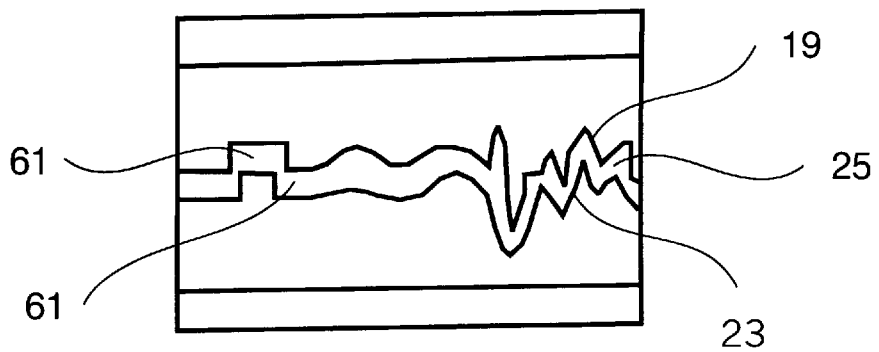

Referring now to FIG. 1(a) through FIG. 1(c), the Navy researchers examined stress states in resin-rich layers having geometries which varied from linear to superimpositionally sinusoidal to fractal-like. A Weierstrass function was arbitrarily chosen to generate the disordered, fractal-like interface; the fractal interfacial geometry was approximated by a truncated Weirstrass series. The resin-rich layers were embedded within composite laminates subjected to through-thickness loads.

As shown in each of FIG. 1(a) through FIG. 1(c), the secondary bond site (between first composite layer 17 and second composite layer 21) was completely or substantially filled with resin. In FIG. 1(a), linearly profiled secondary bond site 31 was formed at the interface between first linearly profiled composite surface 27 and second linearly profiled composite surface 29. In FIG. 1(b), sinusoidally profiled secondary bond site 61 was formed at the interface between first sinusoidally profiled composite surface 57 and second linearly profiled composite surface 59. In FIG. 1(c), inventive fractally profiled secondary bond site 25 was formed at the interface between first fractally profiled composite surface 19 and second fractally profiled composite surface 23. Juxtaposed in FIG. 1(c) (proceeding from left to right) are a rectilinear sinusoidal (e.g., square wave) profile, a curvilinear sinusoidal profile, and an inventive fractile-like profile.

With reference to FIG. 2, the numerical evaluations demonstrated that a fractal interface geometry reduced the stresses in the bulk of the resin material and concentrated the stresses over small regions in the peaks and valleys of the fractal interface. The results of these analyses suggested to the inventors that more favorable resin stress states are associated with more disordered interface geometries.

In these tests, a favorable resin stress state was indicated by reduction of normal stresses and introduction of yield stress gradients within the resin-rich layer. These results were based on highly idealized numerical studies. Nevertheless, these results suggested that the stress concentration regions may serve as a myriad of crack initiation sites which are a good energy absorption mechanism, provided the cracks do not coalesce and propagate.

Based on this experimentation, the inventors speculated that propagation of these cracks would be prevented or delayed by: (i) the fractal path that the crack would have to follow, and (ii) the unfavorable stress state (i.e., unfavorable for crack propagation) created by the fractal geometry. "Unfavorability" in this context entails reduction in the direct tensile stresses and increase in the shear stresses, thereby allowing for ductile flow, since composite resins are often brittle in tension but ductile in shear.

The numerical results suggested that a fractal interface geometry may provide benefits over a more ordered interface geometry through the reduction of pressure stresses and the introduction of yield stress gradients. The localized tensile stress concentrations appeared to be likely crack initiation sites, but it was not clear whether cracks would propagate unstably with this geometry and stress state. Analytical models based on crack propagation from a system of pores (See Wimmer, S. A. and Karr, Dale G. 1996. "Compressive Failure of Microcracked Porous Brittle Solids." *Mechanics of Materials* 22:265–277, incorporated herein by reference) were then considered to address microcrack coalescence and propagation under these conditions.

In a subsequent experimental effort by Navy researchers, the objective was to fabricate thick composite laminates with two secondary bond geometries, linear and fractal-like, at the mid-plane of the laminate. Through-thickness tension specimens cut from these laminates would then be used to evaluate through-thickness tension strength and strain-to-failure (as an indicator of toughness) for the two different interface geometries. The laminates would be fabricated using typical Navy marine production procedures and laminate thicknesses.

Standard Navy composite fabrication procedures result in composite laminates with a linear secondary bond geometry. Production of a composite laminate with a disordered secondary bond geometry introduces a number of analytical and fabrication issues. Simplified analyses were required to identify key parameters of the disordered profile. These key parameters then had to be captured in the fabrication of the laminate.

Fractal geometry is a genre of mathematics which is developing as an alternative to the more conventional form of geometry, viz., Euclidean geometry. Incorporated herein by reference is the following classic treatise on the subject of fractal geometry, written by one of the pioneers in the field: Benoit B. Mandelbrot, *The Fractal Geometry of Nature*, New York, N.Y.: W.H. Freeman and Company, 1982. Mandelbrot's work, which builds particularly on the work of French mathematician Gaston Maurice Julia, has contributed significantly to the development of fractal modes of perspective in a variety of scientific and other disciplines. See, e.g., Benoit B. Mandelbrot, "A Multifractal Walk down Wall Street," *Scientific American*, February 1999, pp 70–73, incorporated herein by reference.

As Mandelbrot discloses in his treatise, Euclidean geometry fails to adequately represent many irregular and fragmented forms in nature. Mandelbrot refers to such shapes as "fractals." Fractals are manifested as both two-dimensional and three-dimensional shapes. Fractals are characterized by a kind of "self-similarity" and "independence of scale" in the sense that they reveal similar shapes on both smaller and larger scales. As understood by those who are ordinarily skilled in the art, a fractal can be generated to the desired level of precision by implementing an iterative or recursive function.

A well known type of fractal dimension is known as the "Hausdorff-Besicovich" dimension. According to Mandelbrot, a fractal is defined by its topological dimension and by its Hausdorff-Besicovich dimension. The topological dimension is the conventional sense of dimension; e.g., the topological dimension of a point is 0, the topological dimension of a line is 1, the topological dimension of a surface is 2, the topological dimension of a solid such as a sphere or cube is 3, etc. Hence, the topological dimension is always an integer; however, the Hausdorff-Besicovich dimension is not necessarily an integer. The Hausdorff-Besicovich dimension is always greater than or equal to the topological dimension. Roughly speaking, the fractal dimension of an object is calculated by taking the limit, as the scale of measurement approaches zero, of the following quotient: log (change in size of object)/log (change in scale of measurement).

Figure 3A:
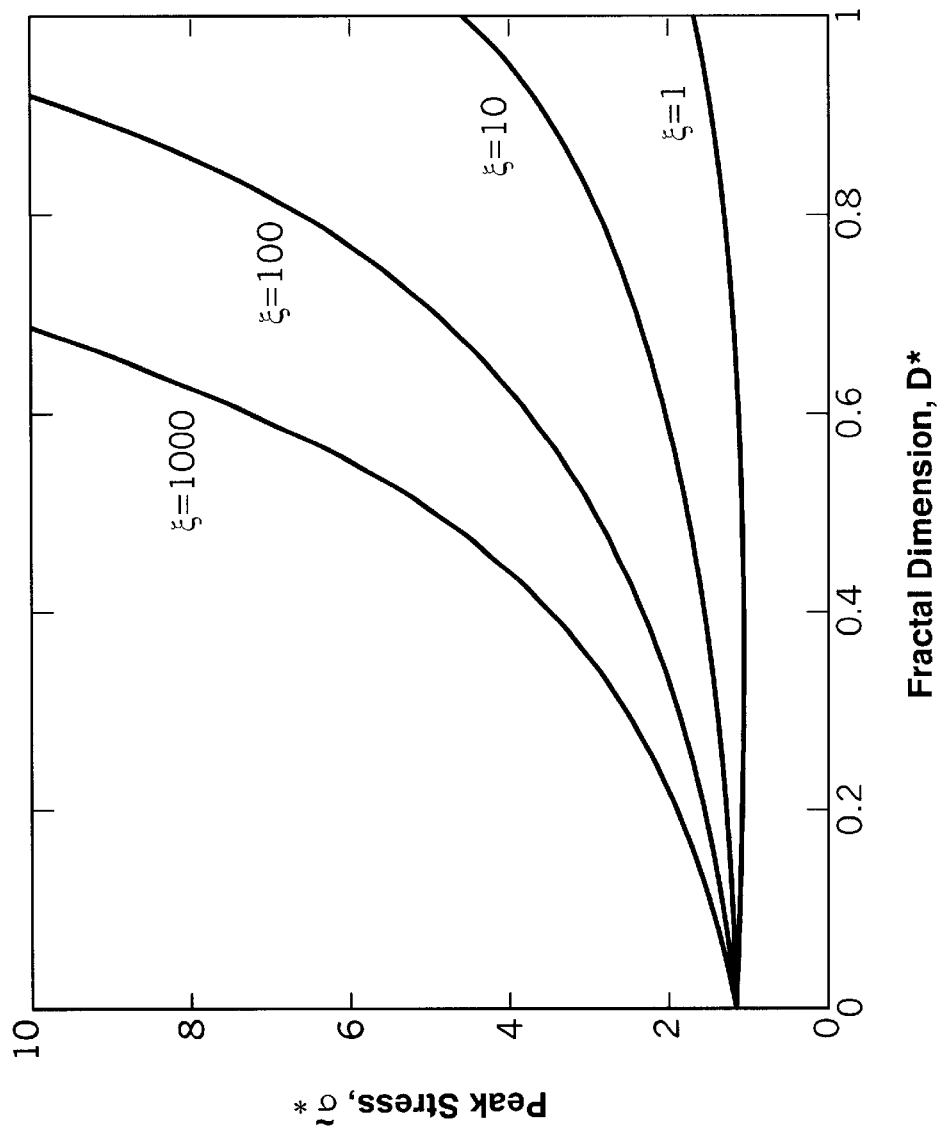
FIG. 3(*a*) is a graph illustrating inventive analytical results in terms of peak stress as a function of fractal dimension.
FIG. 3(b) is a graph illustrating inventive analytical results in terms of normalized stress-strain as a function of fractal dimension.
Figure 3B:
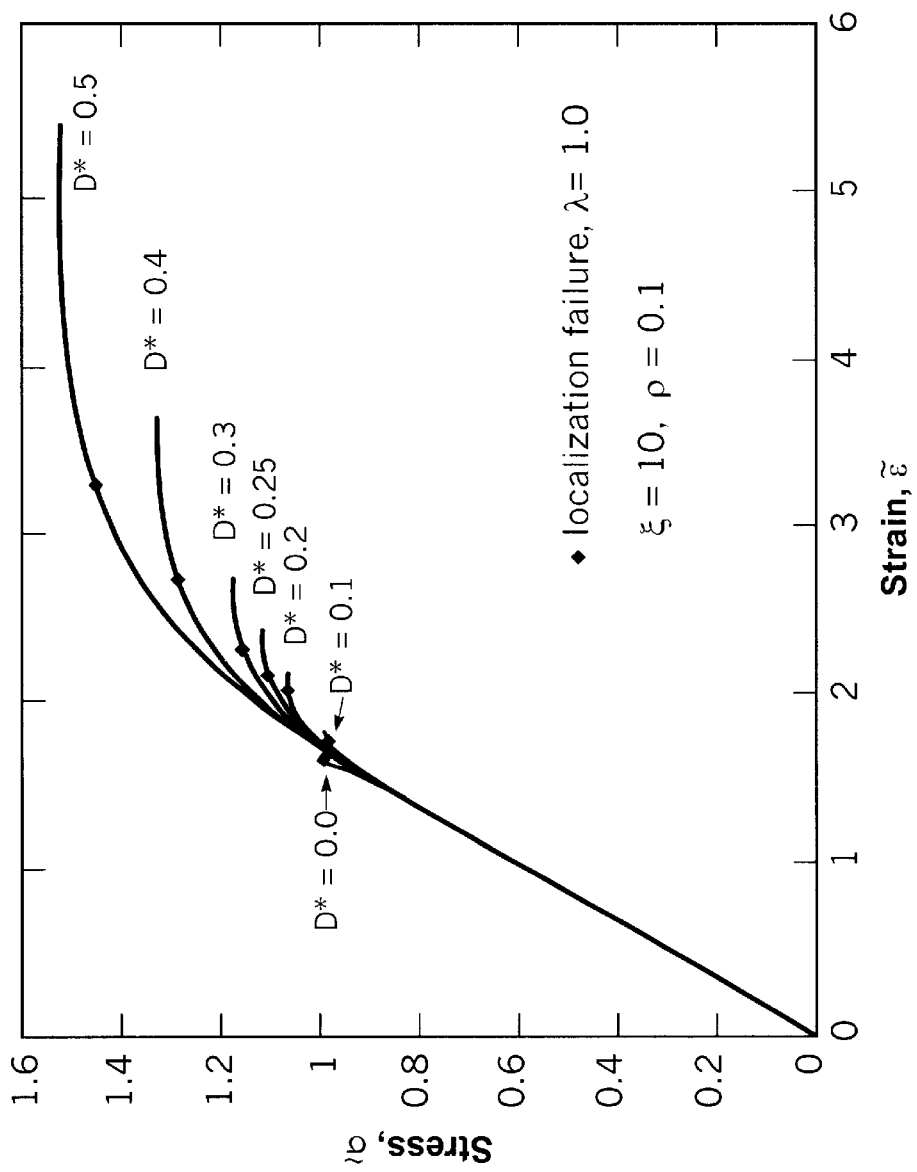

Referring to FIG. 3(a) and FIG. 3(b), and also referring to APPENDIX A, which is incorporated herein by reference, parametric studies of a fractal interfacial geometry were performed, based on fractal fracture mechanics, in accordance with principles, methods and techniques described in the aforementioned manuscript by Karr and Gipple, contained in APPENDIX A, entitled "Fractal Fracture Mechanics of Interlaminar Tensile Failure of Composites."

Let us designate the fractal dimension "D," and designate "D*" the fractal dimension differential, i.e., the difference between the fractal dimension D and the topological dimension. Since the present invention is primarily concerned with a profile manifested as a single line which lies in a single plane and is characterized by some degree of tortuosity, the topological dimension of interest herein is one. We thus establish a relationship between D and D* wherein D=D*+1, or D*=D−1. The derivation of Equation 1, set forth hereinbelow, is contained in APPENDIX A. The non-dimensional peak stress is designated "$\sigma^*$." Non-dimensional peak stress $\sigma^*$ expressed as a function of fractal dimension D, where D*=D−1, is given by Equation 1 and is illustrated in FIG. 3(a).

$$\sigma^* = [\xi^{D^*}(1+D^*)(1-D^*)^{(1-D^*)}(D^*)^{D^*}]^{1/2}$$

In Equation 1, $\xi=(I_0/\eta^*)$, where $I_0$ is half of the initial crack length and $\eta^*$ is a lower bound on the resolution scale. For D*=0, D=1; hence, the analysis reduces to that of linear elastic fracture mechanics.

It is expected that $\xi$, a nondimensional scaled crack length parameter, will be much greater than 1, since an accurate estimate of length would require resolution at a finer scale than that of the profile being measured. Crack growth would proceed in a stable manner at stresses below the peak stress. From previous finite element analyses, high triaxial normal stresses in the resin region between composite layers were localized in the peaks and valleys of the fractal interfacial geometry. It is likely that cracks would initiate in those locations so that $I_0$ might be a function of the width of the peaks and valleys of the fractal profile.

The preceding analysis is based on a single, isolated fractal crack. A damage mechanics approach was used to examine the relationship between crack density and stiffness for multiple fractal cracks, and localization theory was used to predict material failure. See APPENDIX A. FIG. 3(a) shows curves of the peak stress as functions of D* for various values of $\xi$. FIG. 3(b) shows potential changes in the strain-to-failure for different values of D* assuming a crack density of 0.1 and $\xi$ equal to 10.

As shown in FIG. 3(a), there is an increase in the peak stresses as the fractal dimension is increased. In fact, the normalized peak stress $\sigma^*$ is shown to be highly dependent on both $\xi$ and D*. The fracture strength can evidently be increased substantially by increasing the fractal dimension of the crack profile and by establishing a fine scale substructure. These effects increase the surface energy asssociated with fractal crack growth.

It is noted that Chen et al., discussed previously herein, were concerned with fractal dimensions on the order of 1.2. It is seen in FIG. 3(a) that, as a general rule, the peak stress does not significantly increase until the fractal dimension D reaches a value of approximately 1.4. Also, as a general rule, the peak stress does not significantly increase until the fineness of scale $\xi$ reaches a value of approximately 10.

Therefore, a useful "rule of thumb" for inventive practice provides at least one of: (i) a fractal dimension of at least 1.4; and, (ii) a fineness of scale of at least 10. That is, inventive practice preferably effectuates either a fractal dimension of at least 1.4, or a fineness of scale of at least 10, or both a fractal dimension of at least 1.4 and a fineness of scale of at least 10. Moreover, a useful general observation of the interplay between fractal dimension D and scale fineness $\xi$ is that, as scale fineness $\xi$ increases, a given increase in fractal dimension D will more steeply increase peak stress.

As shown in FIG. 3(b), there is a considerable increase in the strain-to-failure. For a single fractal crack, the peak stress is achieved which is associated with the material's strength. These strengths, however, may not be reached because of the occurrence of localization. The localization stress levels for each particular case are somewhat less than the peak stress, but this reduction is rather small; therefore, peak stresses are often a good approximation of material strength. The strains-to-failure, on the other hand, may be considerably less when localization conditions are considered. Thus, the additional strain energy absorbed during loading can be limited to values considerably below those predicted by analysis of single fractal cracks.

The term "tortuosity" refers to the degree of path complexity of the fractal crack profile. The tortuosity of the fractal profile can be expressed, for example, as [(mean path length)/(minimum possible path length)]$^2$; however, it may be more meaningful, for inventive purposes, to consider the tortuosity to be characterized by the fractal dimension D. That is, the tortuosity varies in accordance with the fractal dimension D.

In sum, the fractal fracture mechanics according to this invention indicate the preferability of high values for fractal dimension D as well as high values for fineness of scale $\xi$. "High values for fractal dimension D" is equivalently stated as "high values for fractal dimension differential D*" or as "high tortuosities." As shown in FIG. 3(a), fractal dimension differential D* and fineness of scale $\xi$, considered together, are predictive of normalized peak stress $\sigma$* As shown in FIG. 3(b), for a given fineness of scale $\xi$, increase in fractal dimension differential D* results in increase in peak stress $\sigma$*. FIG. 3(a) and FIG. 3(b) together reveal that the higher the value of such given scale fineness $\xi$, the more abrupt is the increase in peak stress $\sigma$* in accordance with increase in fractal dimension differential D*. In addition, as more fully discussed hereinbelow, the widths of the "peaks" and "valleys" of the machined fractal interface should be on the order of at least one and preferably several fiber diameters.

The experimental aspect of this program was an attempt to capture elements of the analysis in the fabrication of a composite laminate with a fractal-like secondary bond geometry. Every effort was made to simulate the standard Navy composite marine fabrication procedures.

The inventively required features of the interface introduced a number of fabrication issues that are not typically encountered in composite secondary bonding procedures. The desirable features of the secondary bond region based on analysis results included: a profile that was fine enough in scale relative to the fiber diameter; nesting of the fibers in the peaks/valleys of the profile; a disordered distribution of the peaks/valleys in the profile; and, a geometry that introduced multiaxial stresses within the resin rich layer.

To elaborate, there was a need for a fine scale to the disorder (on the order of the fiber diameter or a few multiples thereof). The amplitude of the disorder needed to be on the order of a layer or lamina thickness so that the ductile resin layer could be transversely constrained by the stiffer surrounding composite (resin plus fiber) layers. There was a need for angled shear planes to allow shear flow of the resins; marine composite resins/adhesives are often brittle in tension but ductile in shear. There was a need for a disordered distribution of cracks rather than an ordered distribution of cracks.

Reference now being made to FIG. 4(a) through FIG. 4(d), fabrication of a composite laminate having a secondary bond usually requires a mold plate upon which the first half of the laminate is assembled. After cure, the first half of the laminate is used as the mold plate for the second half. Normally, the mold plate has a linearly profiled (e.g., smooth and planar) surface. In accordance with the present invention, a portion of the mold plate has a fractally profiled (e.g., irregular and disordered) surface.

Figure 4A:
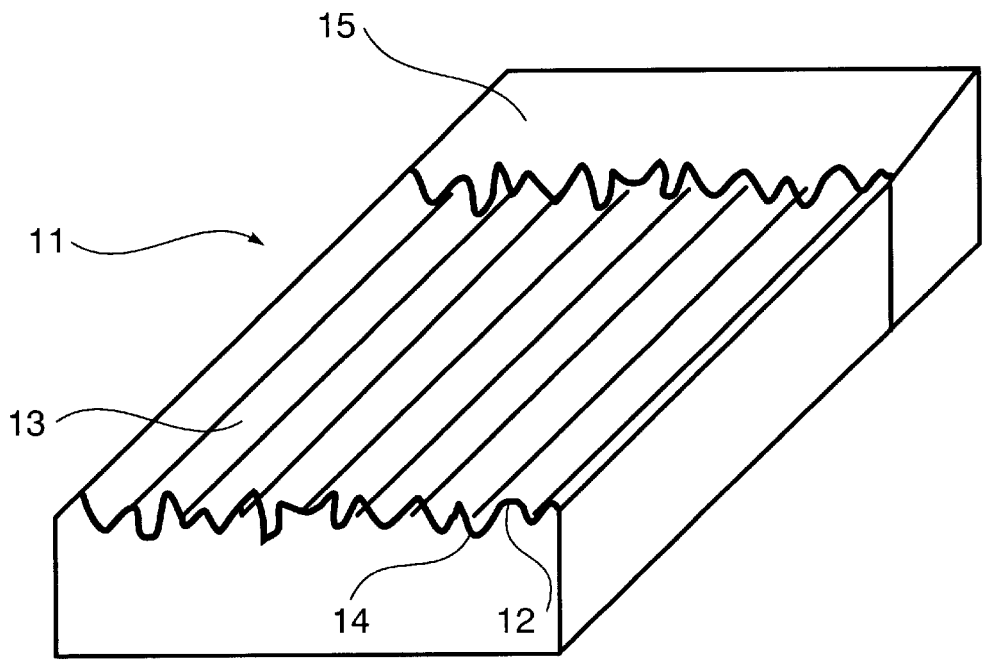
FIG. 4(a) is a diagrammatic perspective view of a metal mold plate upon which the first half of the laminate is laid up and cured according to an inventive fabrication embodiment; the metal mold plate is shown to have a planar mold surface for linear profile and an EDM surface for fractal-like profile.

An inventive steel mold plate 11 (such as shown in FIG. 4(a)), having fractally profiled mold plate surface 13 and linearly profiled mold plate surface 15, was fabricated with approximate dimensions 2 inches wide×10 inches long×0.25 inches thick. Fractally profiled surface 13 was produced via wire EDM (Electrical Discharge Machining) using 0.004 inch diameter wire. Fractally profiled mold plate surface 13 has a plurality of mold plate surface peaks 12 and of mold plate surface valleys 14. In perspective, fractally profiled surface 13 appears as an irregular configuration of alternating peaks 12 and valleys 14, wherein peaks 12 are parallel longitudinal ridges which are erratically shaped and sized, and valleys 14 are parallel longitudinal grooves which are erratically shaped and sized.

EDM is a conventional material-removal technique which uses electricity under carefully controlled conditions to remove metal by means of spark erosion. The three basic components of the EDM process are an electrode (a cutting tool), a dielectric fluid and a conductive workpiece. Generally, a series of rapidly recurring electrical discharges is applied, in the presence of a dielectric field, between the electrode and the workpiece. The resultant tiny metal chips are removed by melting and vaporization, and are washed away by the dielectric fluid (which is controlled so as to provide continuous rinsing).

According to EDM, the electrode never touches the workpiece; rather, a controlled spark from the electrode to the workpiece (this small spark occurring thousands of times per second) causes a small portion of the workpiece to melt and vaporize—that is, causes the workpiece to be cut or formed. The dielectric fluid (typically, a nonconductive liquid such as deionized water or oil) helps to create and control the spar, provides a shield between the electrode and the workpiece, serves as a coolant to to keep the workpiece cool, and serves as a flushing agent to remove resolidified particles from the cutting area. The workpiece can be any conductive material, including many types of metals.

EDM can create many forms and shapes into the workpiece, depending upon the configuration and motion of the electrode. "Wire EDM" (alternatively referred to as "wirecut EDM" or "wire-cut EDM") implements a travelling wire electrode. The continuously spooling conducting wire electrode moves in preset patterns around the workpiece. Tool wear is avoided in this manner, for the wire is constantly being replenished. Normally, the wire is controlled using CNC (Computer Numerical Control). Navy researchers effectuated wire EDM using CDC for purposes of making the workpiece, viz., inventive steel mold plate 11.

In the light of this disclosure, the ordinarily skilled artisan will be capable of performing EDM using CNC, for purposes of practicing inventive fabrication. Some pertinent U.S. patents, hereby incorporated herein by reference, are the following: Sato et al. U.S. Pat. No. 5,756,956 issued May 26, 1998; Seki et al. U.S. Pat. No. 5,025,363 issued Jun. 18, 1991; Ito et al. U.S. Pat. No. 4,839,487 issued Jun. 13, 1989; Ito et al. U.S. Pat. No. 4,806,721 issued Feb. 21, 1989; Obara U.S. Pat. No. 4,649,252 issued Mar. 10, 1987; Shichida et al. U.S. Pat. No. 4,123,645 issued Oct. 31, 1978.

Figure 4D:
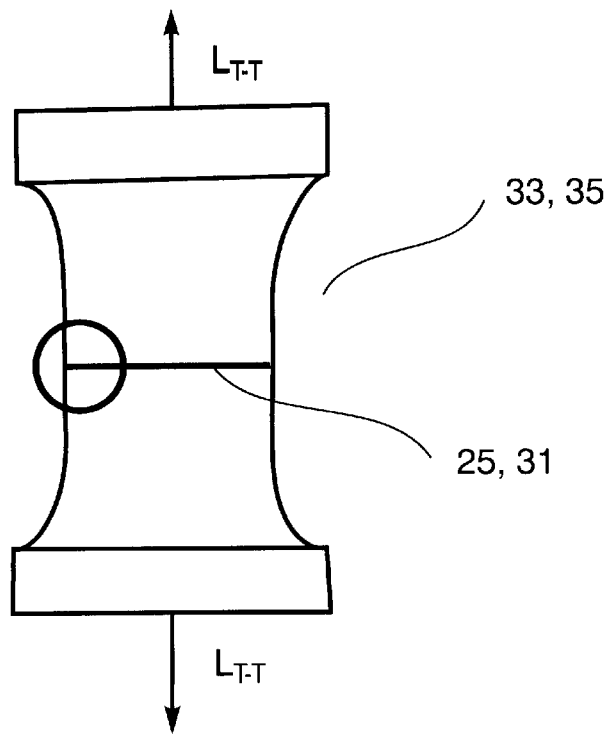
FIG. 4(d) is a diagrammatic elevation view of the inventively fabricated specimen which is partially shown in FIG. 4(c), indicating therein a fractal-like secondary bond location (region) which was used to determine through-thickness tensile strength and strain-to-failure in response to out-of-plane loading.
Figure 4B:
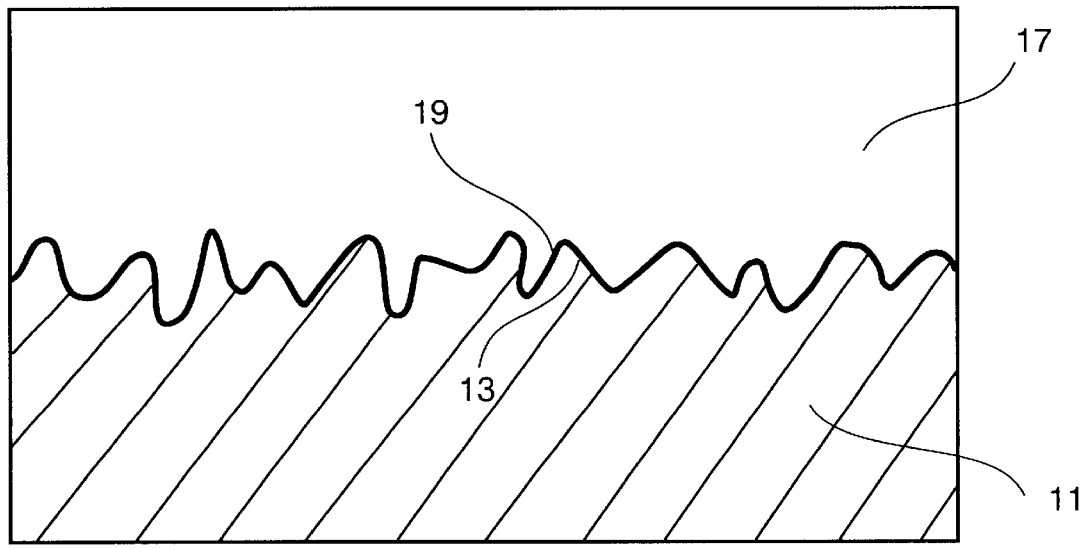
FIG. 4(b) is a diagrammatic elevation partial view illustrating inventive fabrication using, as a mold, the metal mold plate shown in FIG. 4(a).

As shown in FIG. 4(b), composite part 17, approximately 0.5 in thick, was then fabricated implementing mold plate 11, using a VARTM process onto mold plate 11. The first half of the laminate was laid up and cured upon fractally profiled mold plate surface 13, yielding first composite part 17 having first fractally profiled composite surface 19. The resin was a vinylester 510A. The fiber was an E-glass woven roving or unidirectional fabric.

Figure 4C:
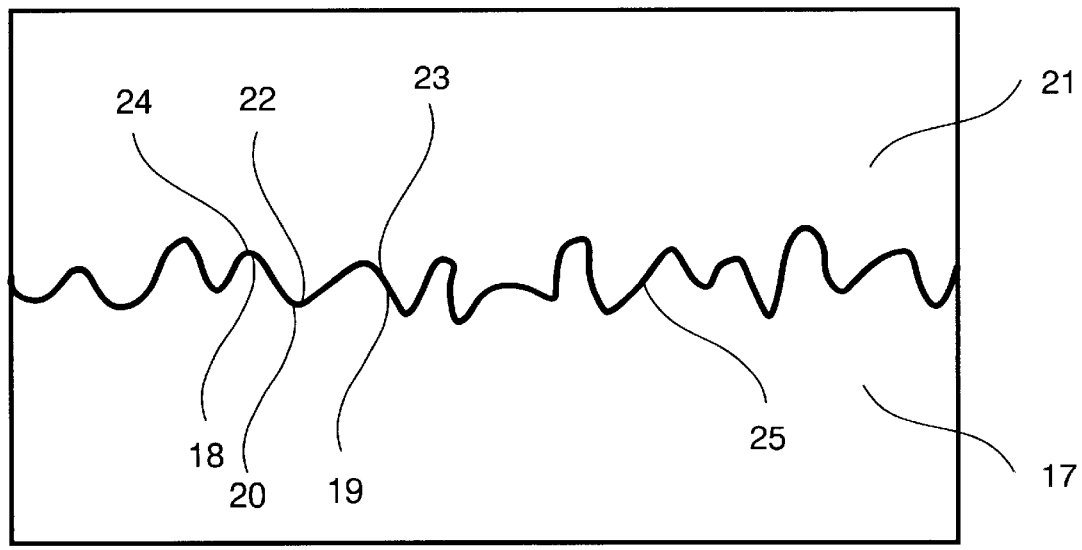
FIG. 4(c) is a diagrammatic elevation partial view illustrating inventive fabrication using, as a mold, the lamina shown in FIG. 4(b).

As shown in FIG. 4(c), first composite part 17 was then implemented as the mold for second composite part 21. Second composite part 21 was fabricated using a VARTM process onto first composite part 17. The second half of the laminate was laid up and cured upon first fractally profiled composite surface 19, yielding second composite part 21 having second fractally profiled composite surface 23. The combined thickness of mated composite parts 17 and 21 was approximately 1 inch.

As shown in FIG. 4(c), secondary bond site 25 was established at the interface between composite part 17 and composite part 21. More specifically, fractally profiled secondary bond site 25 was formed at the interface between first fractally profiled composite surface 19 and second fractally profiled composite surface 23. Linearly profiled secondary bond site 31 (like in FIG. 1(a)) was formed at the interface between first linearly profiled composite surface 27 and second linearly profiled composite surface 29.

Fractally profiled secondary bond site 25 revealed a fractal-like profile commensurate with the meshing of fractally profiled composite surface 19 with second fractally profiled composite surface 23. Geometrically speaking, and with some approximation, fractally profiled mold plate surface 13 could be thought of as an inverted-image twin to first fractally profiled composite surface 19, and as an identical twin to second fractally profiled composite surface 23. In other words, the fractal profile of mold plate surface 13 is approximately congruent with the fractal profile of composite surface 23, and is invertedly approximately congruent with the fractal profile of composite surface 19.

First fractally profiled composite surface 19 has first composite surface peaks 18 and first composite surface valleys 20 which are analogues of mold plate surface valley 14 and mold plate surface peak 12, respectively. Second fractally profiled composite surface 23 has second composite surface peaks 22 and second composite surface valleys 24 which are analogues of mold plate surface peak 12 and mold plate surface valley 14, respectively.

Bearing in mind that the peaks and valleys describe a fractal profile, and hence attempts to attribute regularity thereto have limited meaning, it may nonetheless be useful to consider that, very roughly speaking, there is alternation of peaks 18 and valleys 20, and alternation of peaks 22 and valleys 24. When first fractally profiled composite surface 19 and second fractally profiled composite surface 23 are closely united and secondarily bonded so as to form fractally profiled secondary bond site 25, peaks 18 fit within valleys 24 with approximate coincidence, and peaks 22 fit within valleys 20 with approximate coincidence.

Once mated, composite parts 17 and 21 each represented a layer comprising a fiber-reinforced matrix material—i.e., a resin together with continuous, longitudinally unidirectional fiber reinforcement. The fibers were disposed in the direction of the "grooves" and "ridges" defined by peaks 18 and 22 and valleys 20 and 24. Composite parts 17 and 21 were joined at their respective fractally profiled surfaces 19 and 23 so that some of the fibers of composite part 17 were nested within valleys 24, and some of the fibers of composite part were nested within valleys 20.

Fractally profiled secondary bond site 25 and linearly profiled secondary bond site 31 each represented an intermediate layer comprising a ductile resin. Typically, this type of three-layer composite arrangement (i.e., a sandwich of two composite layers and a secondarily bonding resin therebetween) constitutes a portion of an entire composite laminate, wherein there are many alternations of a fiber-reinforced resin layer and a secondary bond resin layer running through the thickness of the composite laminate.

To elaborate on the above-described inventive fabrication process, the surface of steel mold plate 11 was used to control the geometric profile of the secondary bond. As shown in FIG. 4(a), inventive mold plate 11 had a fractally profiled mold plate surface 13, as well as a linearly-profiled mold plate surface 15. The surface of steel mold plate 11 was machined using a computer numerically controlled (CNC) electrical discharge machining (EDM) procedure. This computer algorithmic control of EDM is illustrated in FIG. 5.

Figure 5:
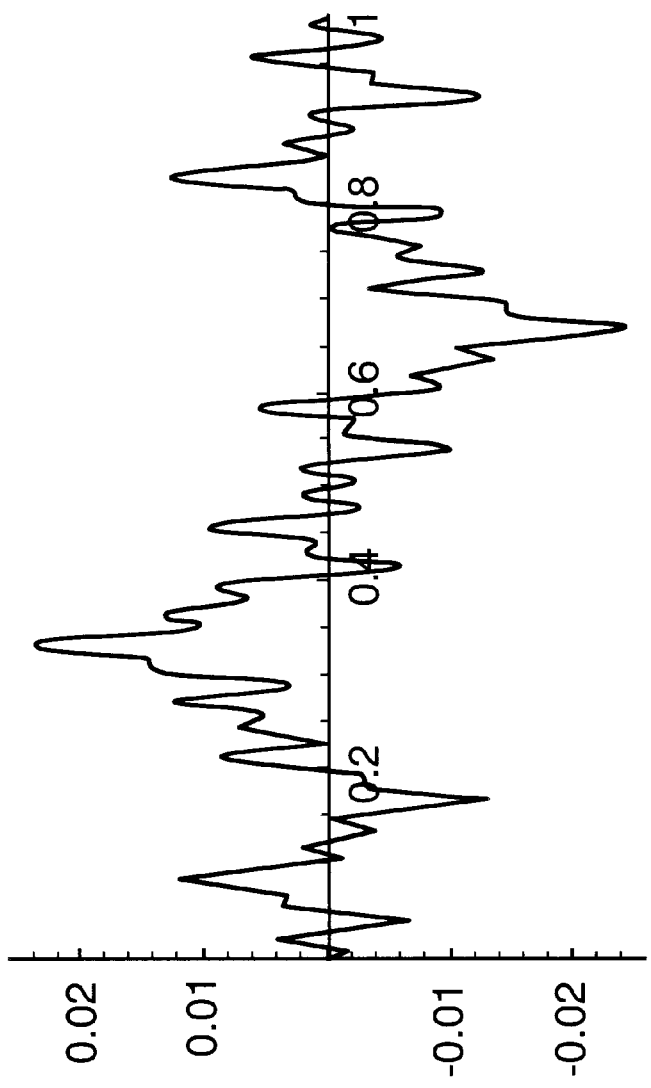
FIG. 5 illustrates, in Mathematica format, a formulation of a Weierstrass equation and its corresponding graph, said formulation associated with the fabrication of a composite laminate having a fractal-like interface in accordance with the present invention.

With reference to FIG. 5, the numerical profile was defined using the following recursive function, a truncated Weierstrass model (5 terms), to obtain the fractal-like surface: $0.00632$ [$\sin(2\pi x)-(1/{}^5\sqrt{2})$ $\sin(4\pi x)+(1/{}^5\sqrt{2})^2$ $\sin(8\pi x)-(1/{}^5\sqrt{2})^3$ $\sin(16\pi x)+(1/{}^5\sqrt{2})^4$ $\sin(32\pi x)-(1/{}^5\sqrt{2})^5$ $\sin(64\pi x)$]. This mathematical definition was chosen solely for the purposes of specificity and repeatability. In the light of this disclosure, it is understood by the ordinarily skilled artisan that inventive practice of EDM using CNC can include effectuation of any of a multitude of recursive functions for purposes of generating the fractal interface.

The fineness of the scale of the profile was limited by the wire diameter used in the wire-cut EDM procedure. The profile was cut with a 0.004" wire, which was the smallest feasible wire size. However, breakage of the thin wire limits the feed rates, which in turn limits the width of the mold plate.

The small size of mold plate 11 limited the number of specimens that could be obtained from each fabrication iteration. The risk of material quality variations within the laminate was also greater as there was little excess material to trim from the edges of the laminate which are typically of poorer quality.

As stated earlier herein, the nesting of reinforcing fibers within the fractal-like profile was a desirable feature. Samples were fabricated with two types of fabrics and a vinylester resin (room temperature cure) using a SCRIMP® process—that is, in accordance with methods and techniques disclosed in William H. Seemann, III U.S. Pat. No. 4,902,215 issued Feb. 20, 1990, entitled "Plastic Transfer Molding Techniques for the Production of Fiber Reinforced Plastic Structures," said U.S. Pat. No. 4,902,215 hereby being incorporated herein by reference. The SCRIMP technology, disclosed in said U.S. Pat. No. 4,902,215, is proprietary to TPI Composite, Inc., Melville Facility, 225 Alexander Road, Portsmouth, R.I. 02871. The word "SCRIMP," a registered trademark of TPI Composite, Inc., is acronymous for "Seemann Composites Resin Infusion Molding Process."

Typical Navy applications use a 24 oz., E-glass woven roving fabric. The coarseness of this fabric and its bi-directionality (warp and weft tows) made it likely that it would not nest or fully drape into the machined profile of the mold plate. As expected, the 24 oz fabric did not follow the profile, but sat on top resulting in a thick linear resin layer at the secondary bond interface. Dow Corning donated a number of unidirectional glass fabrics held together with propylene stringers. The unidirectional fabric resulted in damaged specimens with cracks along the stringers.

Composite part 17 was fabricated with 24 oz. woven roving strands hand-placed along the "grooves" (mold plate surface valleys 14) in mold 11. The surface of mold 11 had a baked-on mold release agent which was chosen to minimize contamination of surface 19 and secondary bond site 25.

According to typical SCRIMP procedures, after the first piece is removed from the mold, the surface of the first piece is sanded so as to remove any residual mold release agent. Sanding in this case, however, would destroy the desired fractal-like surface 19 profile of composite part 17 (the first half of the laminate). Following removal from mold plate 11, first fractally profiled composite surface 19 was wiped with acetone. Woven roving strands were laid up by hand on this composite part 17 surface. Infusion of vinylester resin completed the secondary bonding of composite part 21 (the second half of the laminate) to composite part 17.

The final composite product, shown in FIG. 4(c), was approximately 8" by 4". Four to five specimens 33 with a fractal-like secondary bond and four specimens 35 with a linear secondary bond could be obtained from that piece. Such a fractal secondary bond specimen 33 or linear secondary bond specimen 35 can be considered to be diagrammatically represented in FIG. 4(d), wherein the secondary bond site can be conceived to define, as the case may be, either a fractally profiled secondary bond 25 or a linearly profiled secondary bond 31. The linear secondary bond specimens 35 were obtained from laminate that extended beyond fractally profiled surface 13, onto linearly profiled surface 15, of the machined metal mold 11. Through-thickness loading $L_{T-T}$ was applied to each specimen as shown in FIG. 4(d).

Figure 6A:
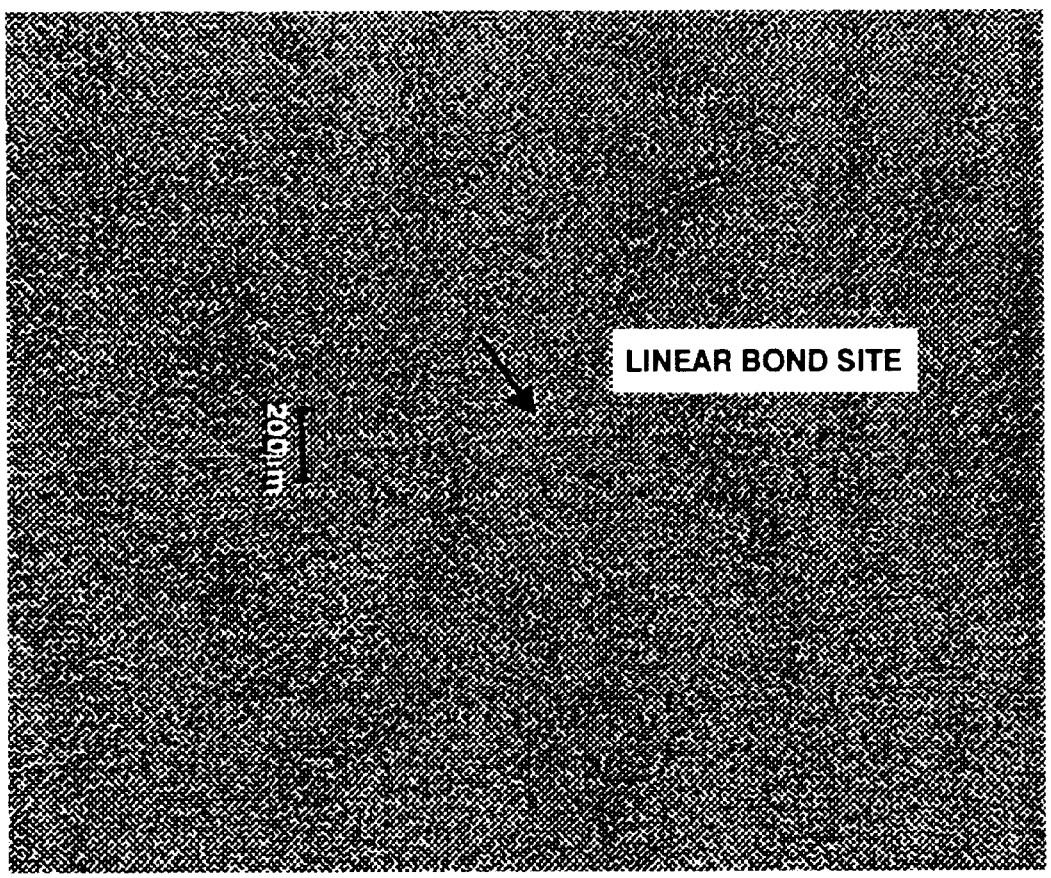
FIG. 6(a) is a black-and-white photograph which provides a magnified view (37.5×) of a linear secondary bond region which was the subject of inventive investigation.
Figure 6B:
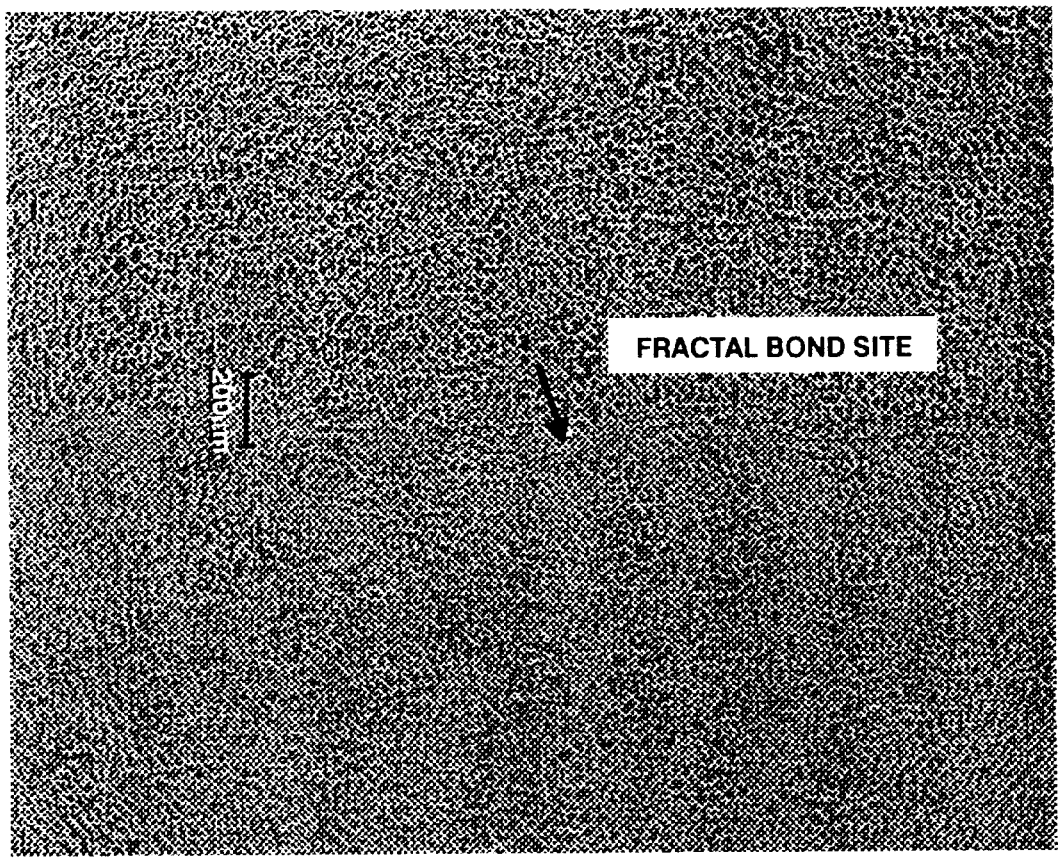
FIG. 6(b) is a black-and-white photograph which provides a magnified view (37.5×) of an inventively investigated fractal secondary bond region such as indicated in FIG. 4(d).
Figure 6C:
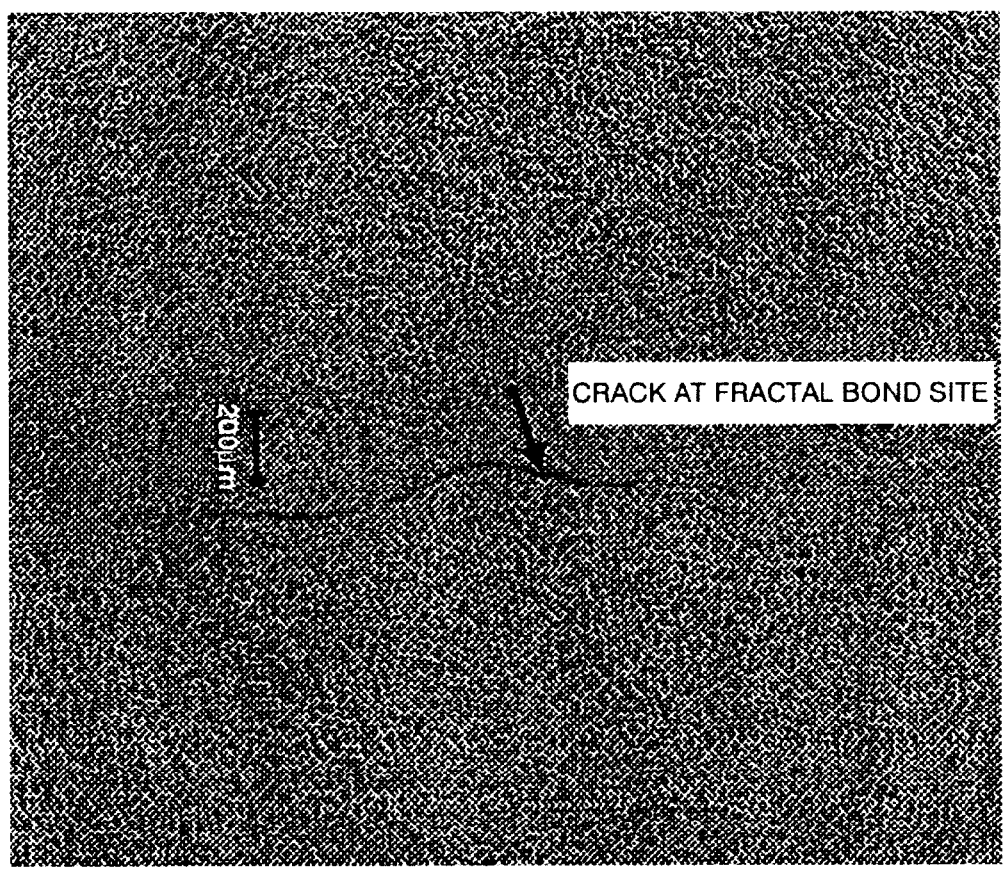
FIG. 6(c) is a black-and-white photograph which provides a magnified view (37.5×) of another inventively investigated fractal secondary bond region such as indicated in FIG. 4(d), this view illustrating inventively undesirable cracking along the secondary bond.

Referring to FIG. 6(a) through FIG. 6(c), photomicrographs were taken of the secondary bond region for both the linear and fractal-like geometries. Overall, as shown in FIG. 6(b), nesting of the fibers along the interface is good. Ideally, though, the fractal-like profiles would have much sharper peaks and valleys relative to the fiber diameter.

Another fabrication quality-related issue with the fractal-like bond is shown in FIG. 6(c), which is a photomicrograph of a portion of a fractal-like bond showing voids and pre-existing cracks existing in the vicinity of the interface. These unwanted inherent (pre-loading) defects are distinguishable from the beneficial small cracks which are shown in FIG. 7(b).

Figure 7B:
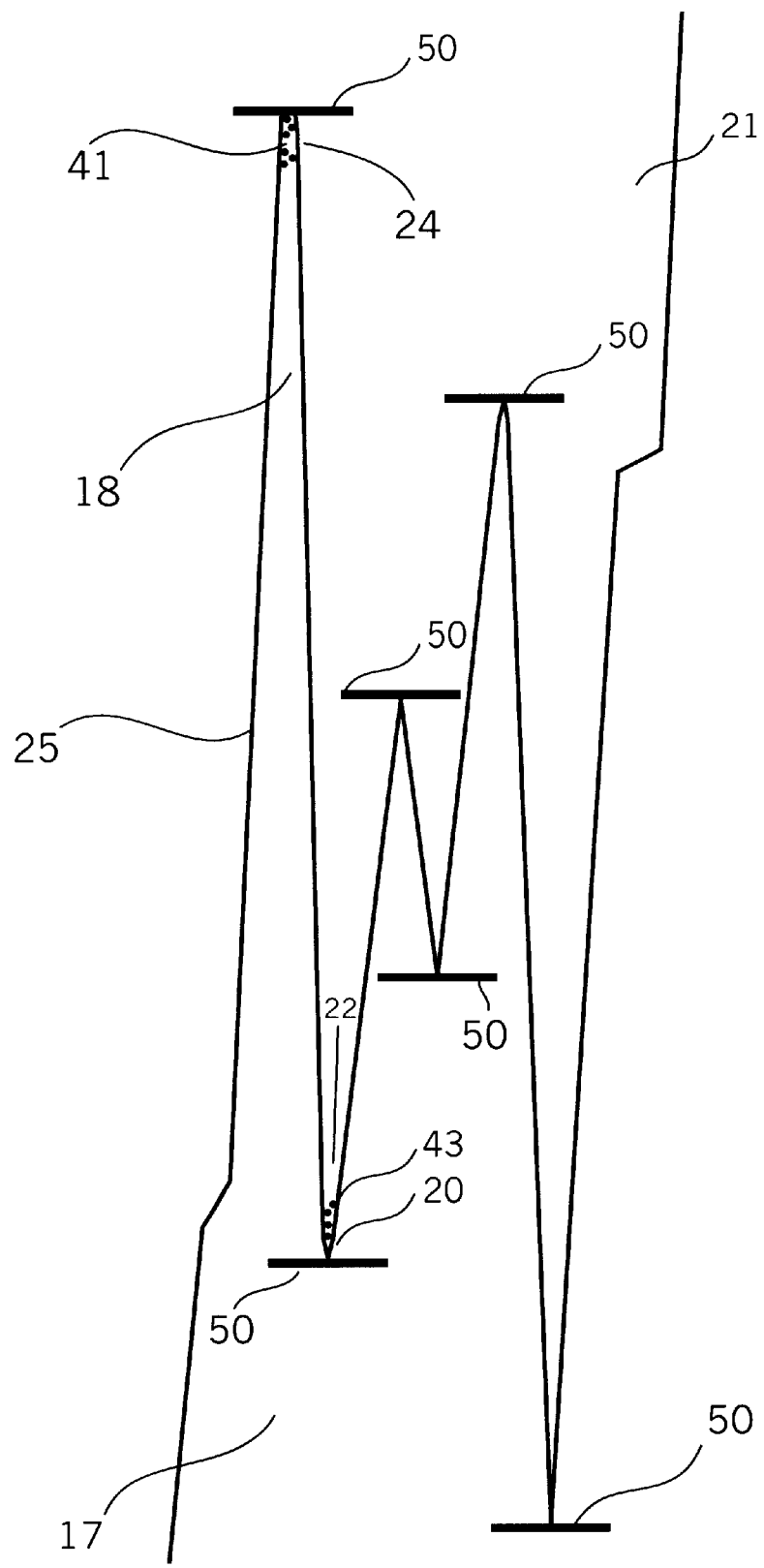
FIG. 7(b) is a partial and enlarged version of the view shown in FIG. 7(a), particularly illustrating inventively advantageous cracking along the secondary bond.

Referring to FIG. 7(a) and FIG. 7(b), ideally, secondary bond profile 25 should be "sharper" (i.e., have a greater scale fineness $\xi$) than that which is shown in FIG. 4(c). The present invention seeks to establish a secondary bond profile which succeeds in achieving a desirable mode of small crack propagation akin to that shown in FIG. 7(b). However, the attainable fineness of scale $\xi$ may be limited by practical considerations. In inventive practice, the fineness of scale $\xi$ may be upwardly limited by the fact that the diameter of the wire used in the EDM processing of metal mold 11 is downwardly limited; that is, 0.004 inches, and possibly 0.002 inches, appears to be the smallest feasible wire size. Theoretically speaking, the smaller the EDM wire diameter, the better; practically speaking, an EDM wire diameter between about 0.002 inches and 0.004 inches is practicable.

As shown in FIG. 7(b), first composite part 17 and second composite part 21 have first fibers 41 and second fibers 43, respectively. Peaks 18 each comprise some first fibers 41 which nest in a valley 24. Similarly, peaks 22 each comprise some second fibers 43 which nest in a valley 20. The small cracks 50 are inventively propagated, at sites which are at or near the maxima of peaks and the minima of valleys, as a consequence of through-thickness loading such as that which the specimen is subjected to as shown in FIG. 4(d).

Reference is now made to FIG. 8, wherein strengths and strains-to-failure are tabularly represented. Only two specimens were available from the linear secondary bond section. One to two specimens from each group (linear and fractal-like) failed prematurely, possibly due to bending from load train misalignment, which is a common difficulty with this test method. Failure in each case was catastrophic.

Strengths from the specimens with a fractal-like secondary bond were approximately 20% greater and strain-to-failure was 75% greater than comparable results for specimens with a linear bond geometry. Each type of specimen exhibited linear stress-strain behavior, but the modulus of the fractal-like bond specimens was significantly lower than that of the linear bond specimens. The presence of cracks in the specimen prior to testing may be the cause of the reduced modulus.

However, the elevated strength of the fractal-like bond relative to the linear bond (more typical of current standard practices) is encouraging. The photomicrograph of the fractal-like bond and these strength increases generally correlates with the analyses illustrated in FIG. 3(a). That is, these limited data suggest that $\xi$ was low (machined profile correlates to D* of 0.8) or that the in-situ profile achieved was of a lower fractal dimension.

The strength and strain-to-failure increases are promising indications that disordered bond line geometries can improve through-thickness strengths, but further fabrication and testing efforts are required to validate these trends. To more fully evaluate the influence of the bond line disorder on the through-thickness strength, several steps should be taken. Additional specimens should be fabricated following the same procedures but attempting to eliminate cracks and voids near the interface.

The possibility of mold release contamination of the secondary bond region in the fractal-like case should be considered. Alternate and more disordered profiles in the secondary bond region could be fabricated and tested looking for increases in strength, nonlinear stress-strain behavior and increased strain-to-failure as compared to this set of data. Testing of future specimens should include four gages around the circumference of the gage section to detect the presence of bending.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. A composite structure comprising a first lamina and a second lamina, said first lamina having a first laminal surface which defines a first laminal fractal profile, said second lamina having a second laminal surface which defines a second laminal fractal profile which is complementary with respect to said first laminal fractal profile, said first laminal surface and said second laminal surface being complementarily joined so as to form an interfacial region which defines an interfacial fractal profile which is described by the engagement of said first laminal fractal profile and said second laminal fractal profile, said interfacial region being bounded by said first laminal surface and said second laminal surface, said interfacial fractal profile being bounded by said first laminal fractal profile and said second laminal fractal profile, said interfacial region being at least substantially characterized by longitudinal constancy of said interfacial fractal profile through said interface in an orthogonal direction with respect to an imaginary vertical plane which passes through said first laminal fractal profile, said second laminal fractal profile and said interfacial fractal profile, wherein:

said first laminal surface describes an arrangement of first longitudinal elevations and first longitudinal depressions; said second laminal surface describes an arrangement of second longitudinal elevations and second longitudinal depressions; said first longitudinal elevations mate with said second longitudinal depressions;

said second longitudinal elevations mate with said first longitudinal depressions;

said longitudinal constancy is manifested by said first longitudinal elevations, said first longitudinal depressions, said second longitudinal elevations and said second longitudinal depressions;

said first lamina includes a first resin and a plurality of first unidirectional fibers which are disposed in said first resin in an orthogonal direction with respect to said imaginary vertical plane;

said second lamina includes a second resin and a plurality of second unidirectional fibers which are disposed in said second resin in an orthogonal direction with respect to said imaginary vertical plane;

some said first unidirectional fibers are disposed in said first longitudinal elevations; and some said second unidirectional fibers are disposed in said second longitudinal elevations.

2. A structure as in claim 1, wherein:

said first longitudinal elevations are each characterized by a first elevational profile width;

said second longitudinal elevations are each characterized by a second elevational profile width;

said first longitudinal depressions are each characterized by a first depressional profile width;

said second longitudinal depressions are each characterized by a second depressional profile width;

said first longitudinal unidirectional fibers are each characterized by a first fibrous width;

said second longitudinal unidirectional fibers are each characterized by a second fibrous width;

each of said first elevational profile width and said second depressional profile width is at least as great as three said first fibrous widths; and each of said second elevational profile width and said first depressional profile width is at least as great as three said second fibrous widths.

3. A structure as in claim 2, wherein said first laminal fractal profile, said second laminal fractal profile and said interfacial fractal profile are each characterized by a fractal dimension of at least approximately 1.4 and a scale fineness of at least approximately 10.

4. A structure as in claim 1, wherein said composite structure comprises secondary bond material which at least substantially occupies said interfacial region.

5. A structure as in claim 1, wherein said first lamina is at least sustantially composed of a first polymer matrix composite material, wherein said second lamina is at least sustantially composed of a second polymer matrix composite material, and wherein said structure has been made by the method comprising:

providing a metal mold having a mold surface which defines a mold fractal profile, said providing including rendering said mold fractal profile in accordance with a recursive mathematical function;

resin transfer molding said first lamina, said resin transfer molding said first lamina including using said metal mold, said first laminal surface thereby being effected by said mold surface so that said first laminal fractal profile is complementary with respect to said mold fractal profile; and resin transfer molding said second lamina, said resin transfer molding said second lamina including using said first lamina, said second laminal surface thereby being effected by said first laminal surface so that said second laminal fractal profile is complementary with respect to said first laminal fractal profile.

6. A structure as in claim 1, wherein:

said first longitudinal elevations are each characterized by a first elevational profile depth;

said second longitudinal elevations are each characterized by a second elevational profile depth;

said first longitudinal depressions are each characterized by a first depressional profile depth;

said second longitudinal depressions are each characterized by a second depressional profile depth;

said first longitudinal unidirectional fibers are each characterized by a first fibrous width;

said second longitudinal unidirectional fibers are each characterized by a second fibrous width;

each of said first elevational profile depth and said second depressional profile depth is at least as great as three said first fibrous widths; and each of said second elevational profile depth and said first depressional profile depth is at least as great as three said second fibrous widths.

7. A structure as in claim 1, wherein:

said first lamina includes a first resin and a plurality of first unidirectional fibers which are disposed in said first resin in an orthogonal direction with respect to said imaginary vertical plane;

said second lamina includes a second resin and a plurality of second unidirectional fibers which are disposed in said second resin in an orthogonal direction with respect to said imaginary vertical plane;

some said first unidirectional fibers are disposed in said first longitudinal elevations; and some said second unidirectional fibers are disposed in said second longitudinal elevations.

8. A structure as in claim 7, wherein said composite structure comprises secondary bond material which at least substantially occupies said interfacial region.

9. A structure as in claim 5, wherein:

said first lamina includes a first resin and a plurality of first unidirectional fibers which are disposed in said first resin in an orthogonal direction with respect to said imaginary vertical plane;

said second lamina includes a second resin and a plurality of second unidirectional fibers which are disposed in said second resin in an orthogonal direction with respect to said imaginary vertical plane;

some said first unidirectional fibers are disposed in said first longitudinal elevations; and some said second unidirectional fibers are disposed in said second longitudinal elevations.

10. A structure as in claim 9, wherein said composite structure comprises secondary bond material which at least substantially occupies said interfacial region.

11. A structure as in claim 5, wherein said composite structure comprises secondary bond material which at least substantially occupies said interfacial region.

12. A structure as in claim 6, wherein said composite structure comprises secondary bond material which at least substantially occupies said interfacial region.

13. A composite structure comprising a first lamina and a second lamina, said first lamina having a first laminal surface which defines a first laminal fractal profile, said second lamina having a second laminal surface which defines a second laminal fractal profile which is complementary with respect to said first laminal fractal profile, said first laminal surface and said second laminal surface being complementarily joined so as to form an interfacial region which defines an interfacial fractal profile which is described by the engagement of said first laminal fractal profile and said second laminal fractal profile, said interfacial region being bounded by said first laminal surface and said second laminal surface, said interfacial fractal profile being bounded by said first laminal fractal profile and said second laminal fractal profile, said interfacial region being at least substantially characterized by longitudinal constancy of said interfacial fractal profile through said interface in an orthogonal direction with respect to an imaginary vertical plane which passes through said first laminal fractal profile, said second laminal fractal profile and said interfacial fractal profile, wherein:

said composite structure comprises secondary bond material which at least substantially occupies said interfacial region;

said first laminal surface describes an arrangement of first longitudinal elevations and first longitudinal depressions;

said second laminal surface describes an arrangement of second longitudinal elevations and second longitudinal depressions;

said first longitudinal elevations mate with said second longitudinal depressions;

said second longitudinal elevations mate with said first longitudinal depressions;

said longitudinal constancy is manifested by said first longitudinal elevations, said first longitudinal depressions, said second longitudinal elevations and said second longitudinal depressions;

said first lamina includes a first resin and a plurality of first unidirectional fibers which are disposed in said first resin in an orthogonal direction with respect to said imaginary vertical plane;

said second lamina includes a second resin and a plurality of second unidirectional fibers which are disposed in said second resin in an orthogonal direction with respect to said imaginary vertical plane;

some said first unidirectional fibers are disposed in said first longitudinal elevations; and some said second unidirectional fibers are disposed in said second longitudinal elevations.

14. A structure as in claim 13, wherein:

said first longitudinal elevations are each characterized by a first elevational profile width;

said second longitudinal elevations are each characterized by a second elevational profile width;

said first longitudinal depressions are each characterized by a first depressional profile width;

said second longitudinal depressions are each characterized by a second depressional profile width;

said first longitudinal unidirectional fibers are each characterized by a first fibrous width;

said second longitudinal unidirectional fibers are each characterized by a second fibrous width;

each of said first elevational profile width and said second depressional profile width is at least as great as three said first fibrous widths; and each of said second elevational profile width and said first depressional profile width is at least as great as three said second fibrous widths.

15. A structure as in claim 14, wherein said first laminal fractal profile, said second laminal fractal profile and said interfacial fractal profile are each characterized by at least one of:

a fractal dimension of at least about 1.4; and a scale fineness of at least about 10.

16. A structure as in claim 13, wherein said first lamina is at least sustantially composed of a first polymer matrix composite material, wherein said second lamina is at least sustantially composed of a second polymer matrix composite material, and wherein said structure has been made by the method comprising:

providing a metal mold having a mold surface which defines a mold fractal profile, said providing including rendering said mold fractal profile in accordance with a recursive mathematical function;

resin transfer molding said first lamina, said resin transfer molding said first lamina including using said metal mold, said first laminal surface thereby being effected by said mold surface so that said first laminal fractal profile is complementary with respect to said mold fractal profile; and resin transfer molding said second lamina, said resin transfer molding said second lamina including using said first lamina, said second laminal surface thereby being effected by said first laminal surface so that said second laminal fractal profile is complementary with respect to said first laminal fractal profile.

17. A matrix composite laminate comprising first and second layers which join so as to form a tortuous interface, wherein:

said first layer includes plural parallel linear first fibers;

said second layer includes plural parallel linear second fibers;

said first and second fibers are parallel to each other;

said first layer has a tortuous first face;

said second layer has a tortuous second face;

said tortuous first face has plural first ridges and plural first grooves which are parallel to each other and to said first and second fibers;

said tortuous second face has plural second ridges and plural second grooves which are parallel to each other and to said first and second fibers;

said first ridges, said first grooves, said second ridges and said second grooves are parallel to each other;

some said first fibers are placed in said first ridges;

some said second fibers are placed in said second ridges;

said first face is characterized by a first face fractality which manifests in the direction perpendicular to said first and second ridges and first and second grooves;

said second face is characterized by a second face fractality which manifests in the direction perpendicular to said first and second ridges and first and second grooves;

said tortuous interface is characterized by an interface fractality which manifests in the direction perpendicular to said first and second ridges and first and second grooves;

said first face fractality and said second face fractality are inversely congruent, said first face fractality and said second face fractality thereby meshing with each other, said first face fractality and said second face fractality thereby defining said interface fractality, said first ridges thereby fitting said second grooves, said second ridges thereby fitting said first grooves, said first and second ridges and first and second grooves thereby defining said tortuous interface;

said first face is characterized by at least approximate linearity which manifests in the direction of said first and second ridges and first and second grooves;

said second face is characterized by at least approximate linearity which manifests in the direction of said first and second ridges and first and second grooves;

said tortuous interface is characterized by at least approximate linearity which manifests in the direction of said first and second ridges and first and second grooves;

said first face fractality manifests approximately identically at at least substantially all locations along said first and second ridges and first and second grooves;

said second face fractality manifests approximately identically at at least substantially all locations along said first and second ridges and first and second grooves; and said interface fractality manifests approximately identically at at least substantially all locations along said first and second ridges and first and second grooves.

18. A matrix composite laminate as recited in claim 17, wherein said first face fractality, said second face fractality and said interface fractality are each indicative of the same recursive mathematical function.

19. A matrix composite laminate as recited in claim 17, wherein:

each said first ridge has nested therein a plurality of said first fibers;

each said second ridge has nested therein a plurality of said second fibers;

said tortuous interface generally describes an imaginary interface plane;

said plurality of said first fibers includes at least three said first fibers which lie in a first imaginary plane which is parallel to said first imaginary plane; and said plurality of said second fibers includes at least three said second fibers which lie in a second imaginary plane which is parallel to said imaginary interface plane.

20. A matrix composite laminate as recited in claim 19, wherein said first face fractality, said second face fractality and said interface fractality each have a fractal dimension of at least approximately 1.4.

* * * * *